(12) United States Patent
Hecht

(10) Patent No.: US 12,063,145 B2
(45) Date of Patent: *Aug. 13, 2024

(54) SYSTEMS AND METHODS FOR PROVIDING USER PREFERENCES FOR A CONNECTED DEVICE

(71) Applicant: Wells Fargo Bank, N.A., San Francisco, CA (US)

(72) Inventor: Al Hecht, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/244,725

(22) Filed: Sep. 11, 2023

(65) Prior Publication Data
US 2023/0421437 A1    Dec. 28, 2023

Related U.S. Application Data

(63) Continuation of application No. 18/094,282, filed on Jan. 6, 2023, now Pat. No. 11,757,714, which is a continuation of application No. 16/706,170, filed on Dec. 6, 2019, now Pat. No. 11,552,845, which is a continuation of application No. 14/195,182, filed on Mar. 3, 2014, now Pat. No. 10,530,646.

(60) Provisional application No. 61/922,486, filed on Dec. 31, 2013, provisional application No. 61/806,686, filed on Mar. 29, 2013.

(51) Int. Cl.
*H04L 41/0813* (2022.01)

(52) U.S. Cl.
CPC ............... *H04L 41/0813* (2013.01)

(58) Field of Classification Search
CPC ............... H04L 41/0813; H04L 63/083; H04L 63/0861; H04L 41/0806; H04L 67/1095; H04L 67/306; H04L 41/0856
See application file for complete search history.

(56) References Cited

U.S. PATENT DOCUMENTS

| | | |
|---|---|---|
| 5,521,815 A | 5/1996 | Rose, Jr. |
| 5,978,774 A | 11/1999 | Rogers et al. |
| 6,085,172 A | 7/2000 | Junger |

(Continued)

OTHER PUBLICATIONS

Steven Castle, LG Smart Fridge Knows Your Grocery List, Electronic House, Jan. 11, 2012 (Year: 2012).

(Continued)

*Primary Examiner* — Sm A Rahman
(74) *Attorney, Agent, or Firm* — Foley & Lardner LLP

(57) ABSTRACT

A computing system includes an account associated with a user of the system, and a server. One or more processors are configured to receive user information from a user computing device, wherein the user information is related to a user of the account, determine, based on the user information, one or more user settings preferences related to a second computing device, receive an information request, wherein the information request includes a request to send the one or more user settings preferences to the second computing device, and to send the one or more user settings preferences to the second computing device, wherein the one or more user settings preferences are useable by the second computing device to adjust one or more settings of the second computing device.

20 Claims, 7 Drawing Sheets

(56) References Cited

U.S. PATENT DOCUMENTS

| | | |
|---|---|---|
| 6,587,835 B1 | 7/2003 | Treyz et al. |
| 6,850,902 B1 | 2/2005 | Finch |
| 6,898,598 B2 | 5/2005 | Himmel et al. |
| 6,912,507 B1 | 6/2005 | Phillips et al. |
| 6,934,686 B1 | 8/2005 | Rajagopalan |
| 7,099,850 B1 | 8/2006 | Mann et al. |
| 7,162,451 B2 | 1/2007 | Berger et al. |
| 7,266,533 B2 | 9/2007 | Karas et al. |
| 7,343,551 B1 | 3/2008 | Bourdev |
| 7,689,508 B2 | 3/2010 | Davis et al. |
| 7,766,223 B1 | 8/2010 | Mello et al. |
| 7,778,934 B2 | 8/2010 | Graves et al. |
| 7,822,065 B2 | 10/2010 | Lu |
| 7,991,652 B2 | 8/2011 | Chamberlain |
| 8,117,444 B2 | 2/2012 | Takatori et al. |
| 8,121,983 B2 | 2/2012 | Prahlad et al. |
| 8,260,806 B2 | 9/2012 | Steele et al. |
| 8,452,654 B1 | 5/2013 | Wooters et al. |
| 8,583,549 B1 | 11/2013 | Mohsenzadeh |
| 8,606,640 B2 | 12/2013 | Brody et al. |
| 8,612,349 B1 | 12/2013 | Ledder et al. |
| 8,646,060 B1 | 2/2014 | Ben Ayed |
| 8,825,757 B2 | 9/2014 | Lunt et al. |
| 8,977,408 B1 | 3/2015 | Cazanas et al. |
| 9,292,484 B1 | 3/2016 | Plow et al. |
| 9,305,411 B2 * | 4/2016 | Ricci .................... G06F 3/0482 |
| 10,217,108 B1 | 2/2019 | Hecht |
| 10,572,725 B1 | 2/2020 | Becker et al. |
| 2001/0053980 A1 | 12/2001 | Suliman et al. |
| 2002/0179704 A1 | 12/2002 | Deaton |
| 2003/0028427 A1 | 2/2003 | Dutta et al. |
| 2003/0074265 A1 | 4/2003 | Oshima |
| 2003/0130907 A1 | 7/2003 | Karas et al. |
| 2004/0122685 A1 | 6/2004 | Bunce |
| 2005/0033650 A1 | 2/2005 | Robertson |
| 2005/0097320 A1 | 5/2005 | Golan et al. |
| 2005/0210263 A1 | 9/2005 | Levas et al. |
| 2005/0250538 A1 | 11/2005 | Narasimhan et al. |
| 2006/0179404 A1 | 8/2006 | Yolleck et al. |
| 2006/0208065 A1 | 9/2006 | Mendelovich et al. |
| 2006/0259380 A1 | 11/2006 | Milstein et al. |
| 2007/0162338 A1 | 7/2007 | Lawe |
| 2007/0168175 A1 | 7/2007 | Fux et al. |
| 2007/0255564 A1 | 11/2007 | Yee et al. |
| 2008/0010298 A1 | 1/2008 | Steele et al. |
| 2008/0052184 A1 | 2/2008 | Junger et al. |
| 2008/0071627 A1 | 3/2008 | Junger |
| 2008/0117966 A1 | 5/2008 | Topiwala et al. |
| 2009/0006646 A1 | 1/2009 | Duarte |
| 2009/0008384 A1 | 1/2009 | Roux |
| 2009/0076966 A1 | 3/2009 | Bishop et al. |
| 2009/0083847 A1 | 3/2009 | Fadell et al. |
| 2009/0132392 A1 | 5/2009 | Davis et al. |
| 2009/0132415 A1 | 5/2009 | Davis et al. |
| 2009/0234764 A1 | 9/2009 | Friesen |
| 2009/0288012 A1 | 11/2009 | Hertel et al. |
| 2010/0005034 A1 | 1/2010 | Carpenter et al. |
| 2010/0030578 A1 | 2/2010 | Siddique et al. |
| 2010/0137008 A1 | 6/2010 | Li et al. |
| 2010/0191570 A1 | 7/2010 | Michaud et al. |
| 2010/0205091 A1 | 8/2010 | Graziano et al. |
| 2010/0250364 A1 | 9/2010 | Song et al. |
| 2011/0004921 A1 | 1/2011 | Homer et al. |
| 2011/0020130 A1 | 1/2011 | Murakami et al. |
| 2011/0022483 A1 | 1/2011 | Hammad |
| 2011/0022681 A1 | 1/2011 | Simeonov |
| 2011/0035788 A1 | 2/2011 | White et al. |
| 2011/0106698 A1 | 5/2011 | Isaacson et al. |
| 2011/0179061 A1 | 7/2011 | Chilakamarri et al. |
| 2011/0201306 A1 | 8/2011 | Ali Al-Harbi |
| 2011/0276478 A1 | 11/2011 | Hirson et al. |
| 2011/0307375 A1 | 12/2011 | Maney |
| 2012/0022944 A1 | 1/2012 | Volpi |
| 2012/0041877 A1 | 2/2012 | Rao |
| 2012/0066262 A1 | 3/2012 | Greenberg |
| 2012/0095855 A1 | 4/2012 | Sterling |
| 2012/0150643 A1 | 6/2012 | Wolfe et al. |
| 2012/0150731 A1 | 6/2012 | Isaacson et al. |
| 2012/0150743 A1 | 6/2012 | Isaacson et al. |
| 2012/0179325 A1 | 7/2012 | Faenger |
| 2012/0191615 A1 | 7/2012 | Schibuk |
| 2012/0203750 A1 | 8/2012 | Vaananen |
| 2012/0239581 A1 | 9/2012 | Mosher |
| 2012/0271712 A1 | 10/2012 | Katzin et al. |
| 2013/0013512 A1 | 1/2013 | Cloud et al. |
| 2013/0024327 A1 | 1/2013 | Nargizian |
| 2013/0030934 A1 | 1/2013 | Bakshi et al. |
| 2013/0066740 A1 | 3/2013 | Ouimet et al. |
| 2013/0073365 A1 | 3/2013 | McCarthy |
| 2013/0080289 A1 | 3/2013 | Roy et al. |
| 2013/0110639 A1 | 5/2013 | So et al. |
| 2013/0117087 A1 | 5/2013 | Coppinger |
| 2013/0132219 A1 | 5/2013 | Liberty |
| 2013/0198598 A1 | 8/2013 | Kirsch |
| 2013/0246258 A1 | 9/2013 | Dessert |
| 2013/0325568 A1 | 12/2013 | Mangalvedkar et al. |
| 2013/0325588 A1 | 12/2013 | Kalyanam et al. |
| 2013/0332342 A1 | 12/2013 | Kasower |
| 2013/0332826 A1 | 12/2013 | Karunamuni et al. |
| 2013/0340052 A1 | 12/2013 | Jakobsson |
| 2014/0067564 A1 | 3/2014 | Yuan |
| 2014/0164082 A1 | 6/2014 | Sun et al. |
| 2014/0214626 A1 | 7/2014 | Bowers et al. |
| 2014/0229375 A1 | 8/2014 | Zaytzsev et al. |
| 2014/0244365 A1 | 8/2014 | Price et al. |
| 2014/0244487 A1 | 8/2014 | Seligmann et al. |
| 2014/0379521 A1 | 12/2014 | Novotny et al. |
| 2015/0052064 A1 | 2/2015 | Karpenko et al. |
| 2015/0088337 A1 | 3/2015 | Toohy et al. |
| 2015/0128241 A1 | 5/2015 | Jakobsson |
| 2015/0220924 A1 | 8/2015 | Bakker |
| 2015/0248664 A1 | 9/2015 | Makhdumi et al. |
| 2015/0339652 A1 | 11/2015 | Park et al. |
| 2015/0356562 A1 | 12/2015 | Siddens et al. |
| 2016/0062972 A1 | 3/2016 | Ramakrishnan et al. |
| 2016/0188181 A1 * | 6/2016 | Smith .................. G06F 3/04886 |
| | | 715/765 |
| 2016/0203213 A1 | 7/2016 | Lewis et al. |
| 2016/0239887 A1 | 8/2016 | Zhao et al. |
| 2017/0262421 A1 | 9/2017 | Yue |
| 2018/0181866 A1 | 6/2018 | Dalle et al. |
| 2018/0314711 A1 | 11/2018 | Botner et al. |
| 2019/0108909 A1 | 4/2019 | Lee et al. |

OTHER PUBLICATIONS

"Use AutoFill for credit cards, contacts, and passwords"; https://support.apple.com/guide/safari/use-autofill-ibrw1103; 2018. 2 pages.

Corcoran, Cate T., "Caught in a Cloud: Technology Revolution Reinventing Retail" WWWD: Women's Wear Daily; Los Angeles vol. 199, Iss. 13 (Jan. 20, 2010): 1. (Year: 2010. 4 pages.

Dashlane; "Never forget another password"; https://www.dashlane.com/;2018. 8 pages.

Dashlane; "The most accurate way to autofill forms on the web"; https://www.dashlane.com/features/autofill; 2018. 8 pages.

Desai et al., E-commerce policies and customer privacy: a longitudinal study, Information Management & Computer Security, vol. 20, No. 3, pp. 222-244, Emerald Group Publishing Limited (2012) (Year: 2012).

Gaunt, Matt; "Deep Dive into the Payment Request API"; https://developers.google.com/web/fundamentals/payments/deep-dive-into-payment-request; Jan. 9, 2018. 53 pages.

McCormick et al.; "Payment Request API"; https://docs.microsoft.com/en-us/microsoft-edge/dev-guide/device/payment-request-api; May 24, 2017. 7 pages.

Steven Castle, LG Smart Fridge Knows Your Grocery List, Electronic House, Jan. 11, 2012 (4 pages).

* cited by examiner

SYSTEMS AND METHODS FOR PROVIDING USER PREFERENCES FOR A CONNECTED DEVICE

CROSS-REFERENCE TO RELATED PATENT APPLICATIONS

The present application is a continuation of U.S. patent application Ser. No. 18/094,282 filed Jan. 6, 2023, which is a continuation of U.S. patent application Ser. No. 16/706,170 filed Dec. 6, 2019, which is a continuation of U.S. patent application Ser. No. 14/195,182 filed Mar. 3, 2014, which claims priority to U.S. Provisional Patent Application No. 61/806,686 filed Mar. 29, 2013, and titled "Systems and Methods for Information Storage and Communication," and to U.S. Provisional Patent Application No. 61/922,486 filed Dec. 31, 2013, and titled "Systems and Methods for Providing User Preferences for a Connected Device," each of which is herein incorporated by reference in its entirety for all purposes.

BACKGROUND OF THE INVENTION

A device often includes settings for tailoring the device to a specific user. For instance, a vehicle includes many settings, such as seat position, radio presets, satellite radio subscription information, mirror positions, Bluetooth pairing settings, desired temperature, favorite navigation destinations, and the like in order to provide greater comfort for a user (e.g., driver) of the vehicle. The user may adjust the settings of the vehicle to fit the particular characteristics of the user. However, when a user enters a rental car, for instance, the user's desired settings will not be pre-programmed into the car. The user is required to adjust each individual component of the vehicle having adjustable settings to achieve a comfort similar to that provided by the user's vehicle. Individuals may be required to take similar steps when using any device having adjustable settings and being available for use by more than one user, or when purchasing any new device having adjustable settings. Enhanced systems and methods of facilitating such adjustments and storing such information are provided.

SUMMARY OF THE INVENTION

An embodiment of the present disclosure relates to an information wallet computing system. The system includes an information wallet account associated with a user of the system, and a server having a memory and a processor. The processor is configured to receive user information from a user computing device, wherein the user information is related to a user of the information wallet account, determine, based on the user information, one or more user settings preferences related to a second computing device, receive an information request, wherein the information request includes a request to send the one or more user settings preferences to the second computing device, and to send the one or more user settings preferences to the second computing device, wherein the one or more user settings preferences are useable by the second computing device to adjust one or more settings of the second computing device.

Another embodiment of the present disclosure relates to a method for pairing an information wallet account with a second computing device, the method being implemented by a server residing in a financial institution computing system and having a memory and a processor. The method includes receiving user information from a user computing device, wherein the user information is related to a user of the information wallet account, determining, based on the user information, one or more user settings preferences, wherein the user settings preferences are related to the second computing device, receiving an information request, wherein the information request includes a request to send the one or more user settings preferences to the second computing device, sending the one or more user settings preferences to the second computing device, wherein the one or more user settings preferences are useable by the second computing device to adjust one or more settings of the second computing device, receiving additional user information from the second computing device, wherein the additional user information is related to use of the second computing device by the user, and updating the one or more user settings preferences based on the additional user information.

Another embodiment of the present disclosure relates to a method for providing information from an information wallet account to a second computing device, the method being implemented by a server residing in a financial institution computing system and having a memory and a processor. The method includes receiving user information from a user computing device, wherein the user information includes one or more user settings preferences related to the second computing device and associated with a user of the information wallet account, receiving an information request, wherein the information request includes a request to send the one or more user settings preferences to the second computing device, and sending the one or more user settings preferences to the second computing device, wherein the one or more user settings preferences are useable by the second computing device to adjust one or more settings of the second computing device.

DETAILED DESCRIPTION OF THE PREFERRED EMBODIMENTS

The systems and methods, described in greater detail below, provide an information wallet system configured to receive information from a user and enable the user to communicate the information in a highly secure, convenient, efficient, time-saving, and cost-effective manner. The systems and methods may allow merchants and other businesses to reduce their reliance on technologies such as card swipe, card readers, cash machines, custom kiosks, cash registers, specialized scanners, etc. The information may be stored in the cloud and/or locally on the customer's device. The information may be stored in a financial institution computing system, exclusively or non-exclusively, and maintained by the financial institution. The information may be accessible to the individual and other entities, with the approval of the user, using a mobile device (e.g., laptop, mobile phone, tablet, etc.) or other computer devices. The systems and methods may allow a user to store user settings preferences for a device and automatically send the preferences to the device to update the settings. The user may be able to update the user settings preferences using an information wallet application stored on a user device.

Figure 1:
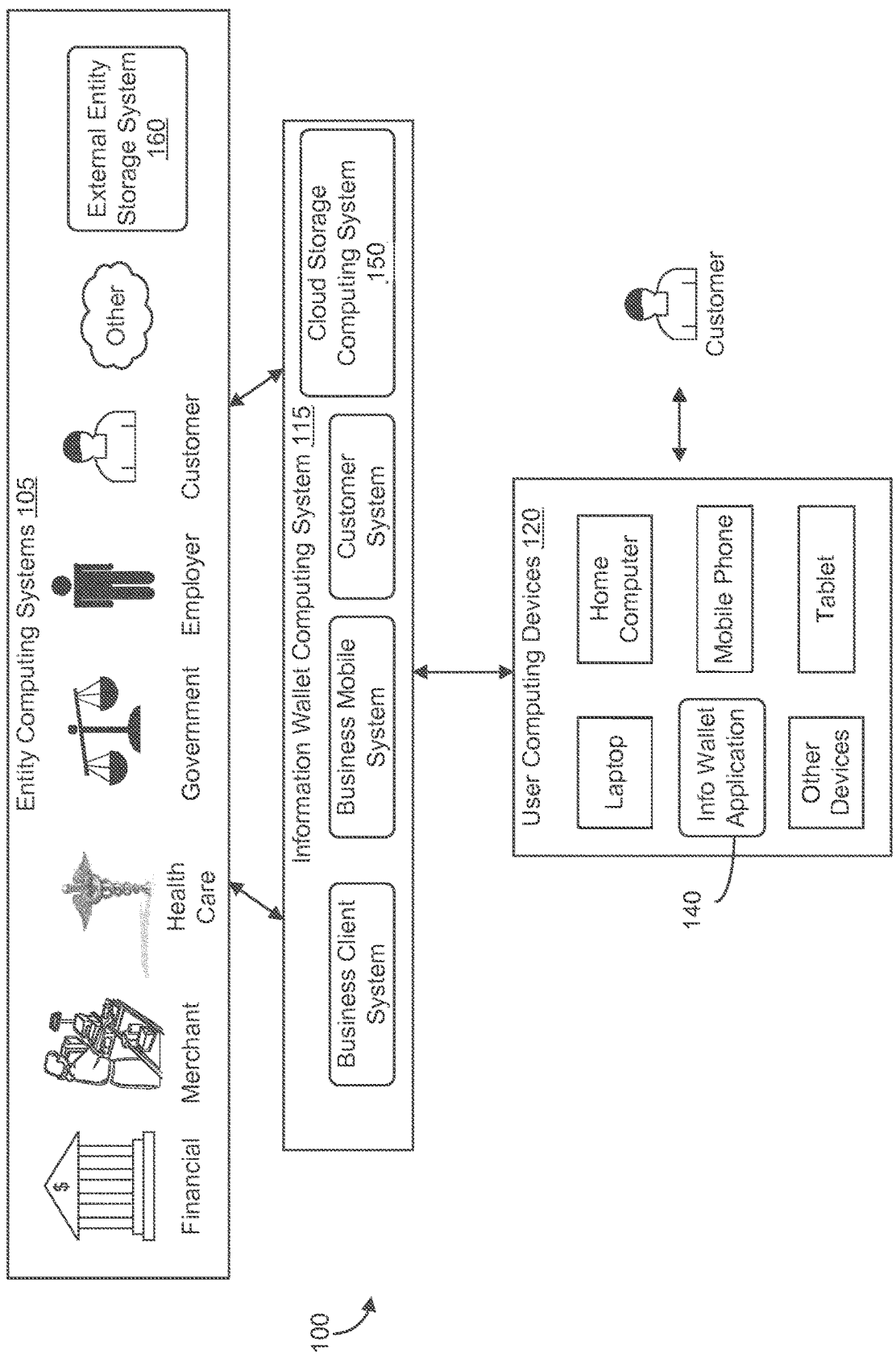
FIG. 1 is a schematic diagram of a computer-implemented information wallet system according to an exemplary embodiment.
Figure 2:
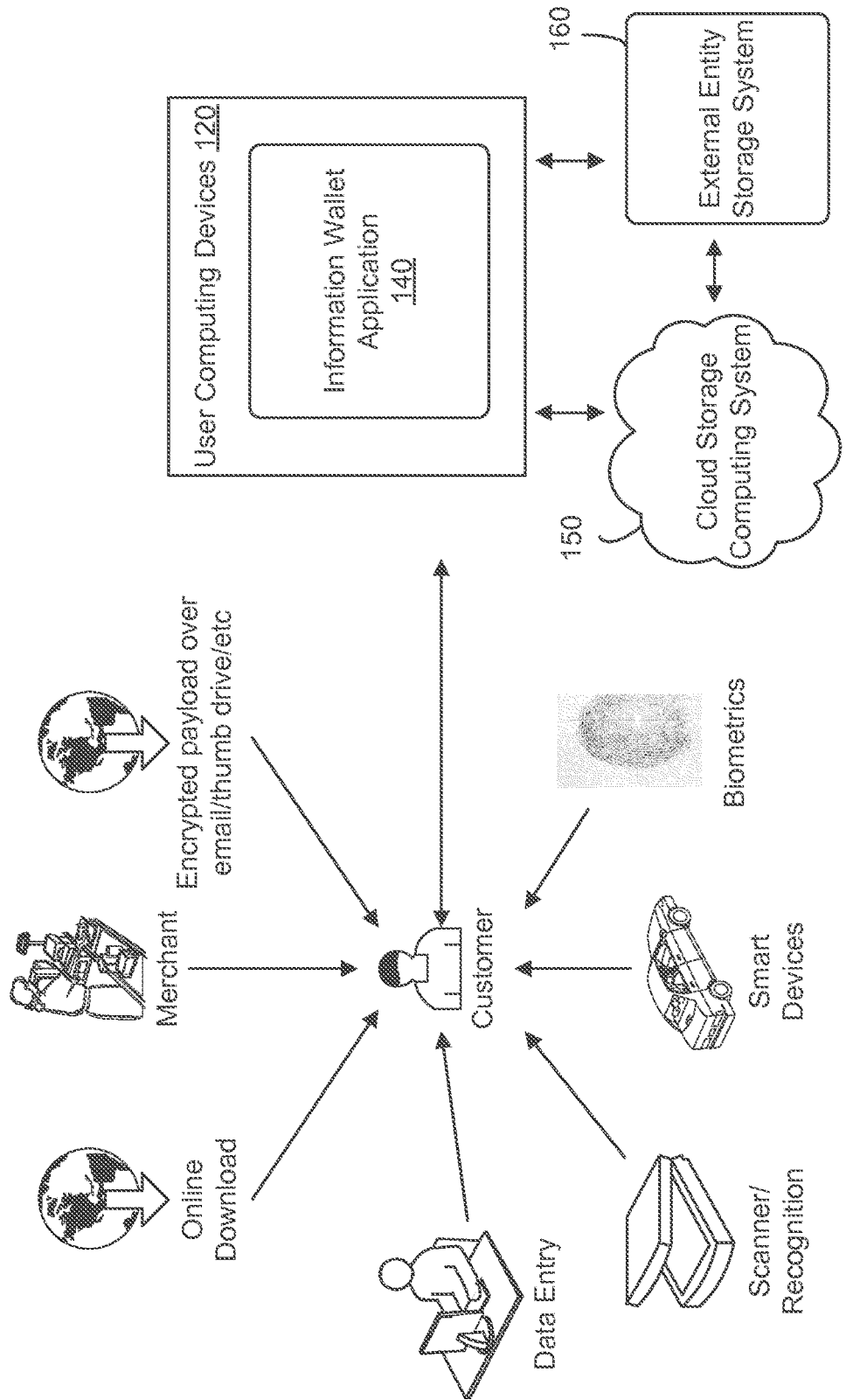
FIG. 2 is a schematic diagram of a computer-implemented information receiving system of the information wallet system in FIG. 1.
Figure 3:
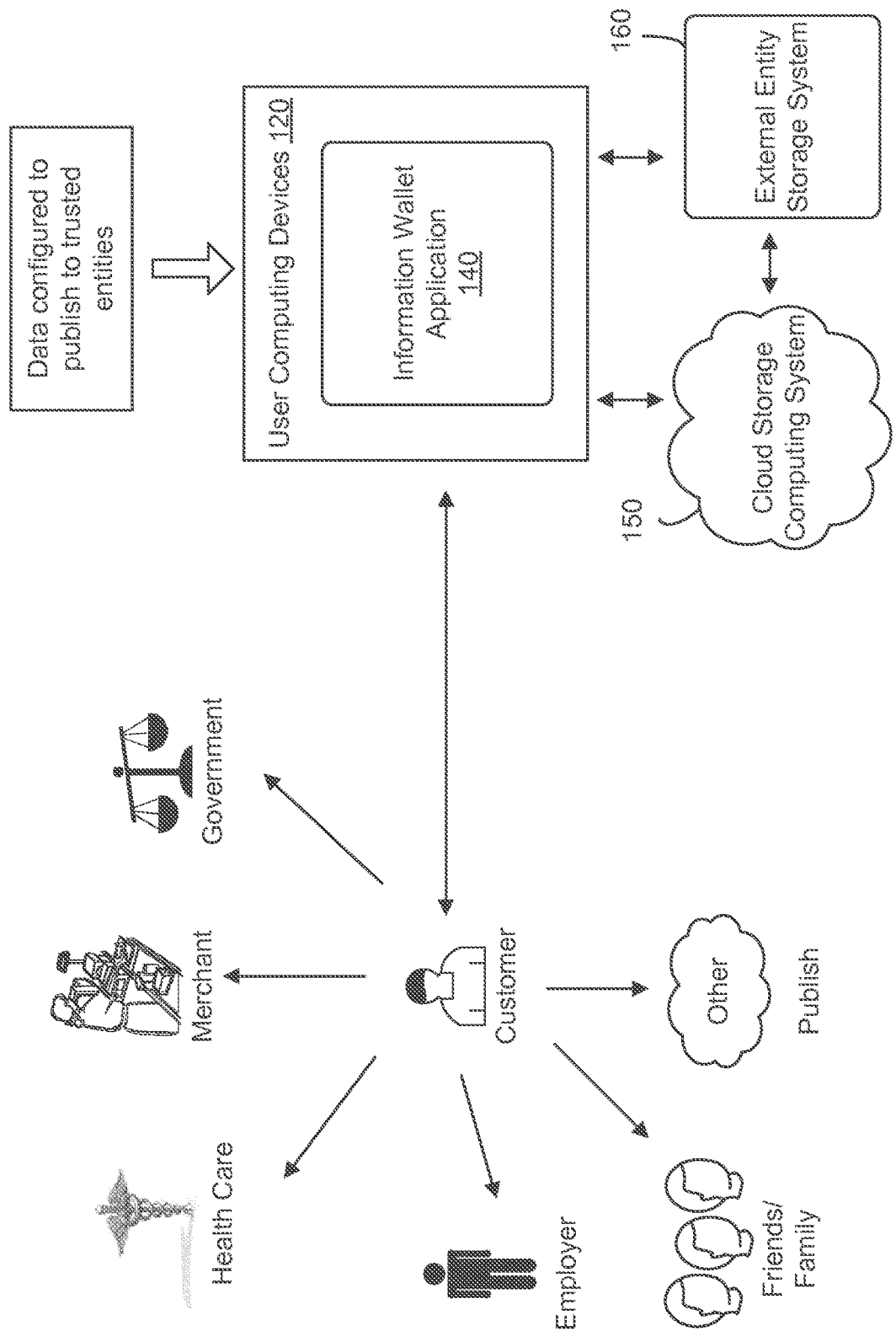
FIG. 3 is a schematic diagram of a computer-implemented information sharing system of the information wallet system of FIG. 1.
Figure 5:
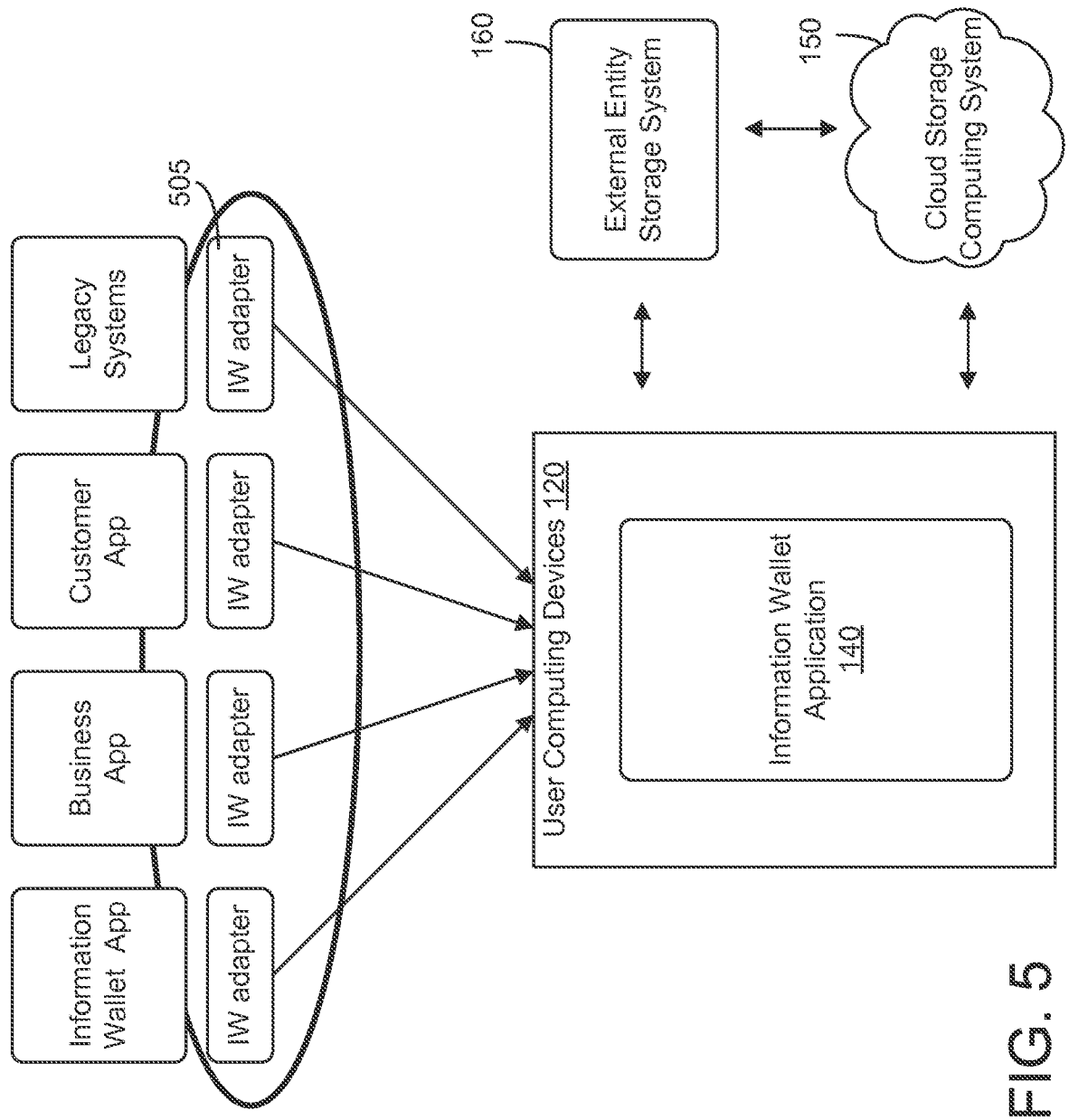
FIG. 5 is a diagram showing information synchronization between various adapters and user applications.

Referring to FIG. 1, a computer-implemented information wallet system 100 is shown that may be used by a customer (also referred throughout as a user) to set up and utilize an information wallet account using a user computing device 120 (i.e. laptop, mobile phone, tablet, or home computer). In the various embodiments, data storage and other functionality for the information wallet system 100 may include a cloud-based storage computing system 150 and/or other functionality provided by the information wallet computing system 115. The information wallet computing system 115, in one example embodiment, may be provided a financial institution computing system (e.g., a bank computing system). The user may be an individual consumer that may have one or more accounts with the financial institution and has also established an information wallet account with the financial institution. In another embodiment, the user may not have a financial account with the financial institution but may nevertheless have established an information wallet account with the financial institution. The information wallet system 100 is configured to meet the varied needs of users in the embodiments above and embodiments discussed below. In other embodiments, the information wallet system 100 may be provided by other entity computing systems 105. Other entity computing systems may comprise a second financial institution, a merchant, a health care organization, a government organization, an employer, a customer, or other entity with a computing system. The other entity computing systems 105 may store data that is accessed by the information wallet system 100 (e.g., in external entity storage systems 160 as shown in FIGS. 2, 3, and 5). The information wallet system 100 may include a link out to the data stored in the other entity computing systems 105 such that the data stored by the other entity computing systems 105 is seamlessly accessed by the information wallet computing systems 115. The information wallet computing system 115 may be used to facilitate storing information and communicating stored information to one or more entities, potentially via a user computing device 120.

Referring to FIG. 1, information wallet system 100 may include, among other systems, entity computing systems 105 (i.e. a merchant computing system and/or a financial institution computing system), an information wallet computing systems 115, a user computing device 120 (which may include a laptop, home computer, mobile phone, tablet, or any other computing devices), and cloud storage computing systems 150. The computing systems and devices 105, 115, 120, and 150 may communicate through a cloud network, which may include one or more of the Internet, cellular network, near field communication (NFC), Bluetooth connection, Wi-Fi, Wi-Max, a proprietary banking network, etc. The entity computing systems 105, information wallet computing systems 115, user computing devices 120, and cloud storage computing systems 150 may each comprise a computer system (e.g., comprising one or more processors) configured to execute instructions, send and receive data stored in non-transitory memory, and perform other operations to implement the operations and functions described herein associated with logic or processes as shown in the figures and discussed throughout the disclosure.

The entity computing systems 105 are implemented by entities that interact to exchange information with users. Such entities, as described above, may include a financial institution, a merchant of goods or services, a health care organization, a government organization, an employer, a customer, or any other entity or combination of entities. The entity computing system 105 may, for example, be provided by any entity that provides goods or services to consumers. The entities may enter into transactions with the user and/or may exchange information with the user. For example, the entity computing systems 105 may implement an Internet destination (e.g., website) where users may obtain user names/login IDs or otherwise become registered members. Registration of the users as members could allow a user and entity to connect quickly and securely, determine and share a variety of relevant information, and optimize the shared information to meet both the user and entity needs. As another example, the entity computing systems 105 may be provided at a bricks and mortar location where the user receives goods or services, such as a store, a hospital, a restaurant, a hotel, etc. The information exchanged may, for example, relate to the goods or services received by the user at the location.

The user computing devices 120 may be used by a user to create an information wallet account and interact with an entity computing system 105. The user computing devices 120 may include mobile devices such as a smart phone, portable gaming device, portable music listening device, portable digital or electronic viewing device, or another suitable wireless device. The user computing device 120 may comprise network interface logic, a display device, an input device, and an information wallet application 140. Network interface logic may include, for example, program logic that connects the user computing device 120 to the network. As described in greater detail below, for example, the user computing device 120 may display screens to prompt the user to review and/or approve data transfer requests, to request data from the user, etc. Such screens may also be used to prompt the user to specify parameters regarding the level of security to be associated with different elements of data regarding the user. For example, data requests including a mailing or physical address may be assigned a higher level of security than data requests involving an email address. Such screens are presented to the user via the display device. The display device may be interactive, for example touchscreen. An input device may be used to permit the user to initiate access to the information wallet and to facilitate sending/receiving requested information to/from the entities. In one embodiment, the input device may allow a user to access and redeem a gift stored in the information wallet system 100.

FIG. 1 shows information wallet computing system 115 disposed between the entity computing systems 105 and the user computing devices 120. In one embodiment, the information wallet computing system 115 is resides within a financial institution computing system. The information wallet computing system 115 may comprise program logic executable by and between the entity computing systems 105 and the user computing devices 120 to implement at least some of the functions described herein. As will be appreciated, the level of functionality that resides on the entity computing systems 105 or information wallet computing system 115, as opposed to the user computing devices 120, may vary depending on the implementation. The information wallet computing system 115 may include modules such as a business client system, business mobile system, and customer system. The business client system module may provide the backend support of the information wallet application disposed on a business client side. Likewise, the business mobile system and customer system modules may provide backend support of the information wallet application disposed on a business mobile device or a customer device. The information wallet computing system 115 may also host the cloud storage computing system 150.

The information wallet computing system 115 may allow the user computing devices 120 to interact with entity computing systems 105. In one embodiment, the information wallet computing system 115 facilitates the exchange of information between the user computing device 120 and the entity computing system 105. For example, the information wallet computing system 115 may receive information from a user computing device 120 and transfer that information to the entity computing system 105. In one embodiment, the information received from the user computing device 120 corresponds with a request to the information wallet computing system 115 to retrieve certain information. The information wallet computing system 115 may receive the request, access the cloud storage computing system 150, retrieve the requested information, and forward the information as requested to the entity computing system 105. In another embodiment, the same process may apply for transferring information from an entity computing system 105 to the user. The information wallet computing system 115 may receive information from an entity computing system 105 and transfer that information to a user computing device 120. The information received may correspond with a request to the information wallet computing system 115 to retrieve certain information from the cloud storage computing system 150. The information wallet computing system 115 may receive the information including the request from the entity computing system 105, access the cloud storage computing system 150, retrieve the requested information, and transfer the information to the user computing device 120. For embodiments described throughout the disclosure, any user, customer, or entity may create an information wallet account through the information wallet system 100 using an available computing device.

The cloud storage computing system 150 may store information that is provided by the user, e.g., after the information wallet is enriched by one or more of the processes shown in FIG. 2, described below. The cloud storage computing system 150 may encrypt the data regarding the user. In some embodiments, the cloud storage computing system 150 may permit an entity to access the data based on a permission or security level granted by a user. For example, if a user configures an information wallet account to allow broad permission for sharing information about vehicles owned by the user, then an entity seeking the user's vehicle information may obtain that information without waiting for further approval. The entity may solicit the information from the cloud storage computing system 150 through the information wallet computing system 115, and the information wallet computing system 115 may retrieve the information based on pre-set permission by the user. The cloud storage computing system 150 may give the user full control of the information stored by the user in the cloud storage computing system 150. The system is configured such that an outside computing system may only access information in conformance with permission and security levels set by a user.

Some of the user information may be stored in the external entity storage systems 160 of entities 105. Accordingly, some data may be stored outside of the cloud storage computing system 150 and the user computing devices 120. In these situations, the information wallet computing system 115 may include a link out to the data stored in the external entity storage systems 160. The link out may be a token that is stored in the cloud storage computing system 150 or in the information wallet application 140 running on the user computing devices 120. The link out indicates to the information wallet system 100 the location and content of the information stored the external entity storage systems 160 of entities 105 such that the data can be integrated into the user's information wallet without having to store the data in the information wallet computing system 115. For example, a user may opt not to store medical information (e.g., an MM, X-rays, etc.) in the information wallet computing system 115, but rather in a records database of the user's medical provider. In this situation, the information wallet computing system 115 may be configured with a link out to the medical information stored in the records database of the medical provider such that that the information wallet system 100 has access to the externally stored data.

In an example embodiment, the information wallet system 100 allows interoperability between various entity computing systems 105 (e.g., external entity storage systems 160), information wallet computing systems 115, user computing devices 120, and other relevant systems. In order to provide the interoperability with each of the above listed systems, various adapters may be utilized on a plurality of systems. Adapters facilitate integrating computing systems of different technological platforms in a manner that allows different computing systems to connect with the information wallet system 100. The adapters may be implemented, for example, using plug-ins or Application Program Interfaces ("APIs"), which comprise a set of software components that add specific abilities to a larger software application. The plug-ins or APIs, in one embodiment, adapt the pre-existing enterprise computing system to connect with the information wallet system 100. The plug-ins or APIs may also enable the functionality of an application to be customized, such as an enterprise application that supports business operations of a business entity or an application (e.g., browser) executed on a user computing device 120. The application may be customized to meet any need or requirement of any particular entity, business, or customer using the information wallet system 100. For example, a hotel may have enterprise software with a plug-in installed that displays a button screen (i.e., "Request via Info Wallet") in the check-in screen. Upon the engaging the button, such as by pressing the button, the enterprise software may execute the plug-in. The plug-in may, for example, initiate the generation of a Bluetooth signal to establish Bluetooth contact with a user computing device 120. A random PIN may be verbally or textually communicated to the user for entry into the user computing device 120 in order to initiate Bluetooth pairing with the user computing device 120 of the user. The plug-in may therefore, via Bluetooth, request information from the information wallet system 100 of the user that is checking into the hotel. In other scenarios, the connection may be made by way of another type of wireless connection, such as but not limited to, Wi-Fi, WAN, 3G, 4G, NFC, etc. The plug-ins or other adapters may use a request/response protocol to communicate messages and execute code. The plug-ins or APIs may send messages in a predetermined format that contain a list of data that is requested. The user computing device 120 may receive the Bluetooth request and generate a screen requesting permission to send the requested information. The adapters may also request certain packages of data. For example, if a common adapter is developed that is used by various hotels using the same enterprise software, then all hotels may ask for the same package of data, and that information may be standardized and prepackaged to be sent each hotel. As will be appreciated, similar arrangements may be implemented in other contexts (e.g., healthcare providers, merchants, etc.).

The cloud storage computing system 150 may cooperate with the information wallet computing system 115 on the user computing device 120 to provide different levels of security to the information stored in the cloud storage computing system 150. For example, the user may configure the information wallet to provide the address and phone number of the user with a first (relatively low) level of security, to provide a credit card number of the user with a second (higher) level of security, to provide the credit card cvv value with a third (still higher) level of security, and to provide the user's social security with a fourth (even higher) level of security. As will be appreciated, any number of different levels of security may be provided. The level of security given to any particular data element may be determined as a matter of default (e.g., information wallet configuration may by default dictate that the user's social security number is given a higher level of security than the user's phone number), based on user-specified inputs (e.g., the user may be given the ability to set security on a data element by data element basis, to set security for groups of related data (e.g. health data vs. financial data), and/or to set security in another manner), etc. The level of security assigned to a specific type of information or data may alter the steps that must be taken in order for the information wallet system to relinquish the information to an outside computing system. For example, information and data with a relatively low level of security may be pre-approved for sharing by the user, and the information wallet computing system 115 may relinquish the information upon request by the entity. On the other hand, information or data assigned a higher level of security may require the information wallet computing system 115 to contact the user through the user computing device 120 and solicit authorization from the user. The authorization may be supplied by a number of ways, including, for example, an electronic signature, a pin number, a finger print, or direct user authorization through the user computing device 120. Security and/or validity of an information request is not exclusively "fixed." The informational wallet will have the capability to determine whether the "context of the transaction" is valid. Accordingly, if certain known patterns of fraud or trolling for information are detected the user may be alerted to the potential fraud or troll for data. Analytical models may be used to determine the probability of a valid or invalid data request.

As will also be appreciated, the security precautions taken in the context of a particular transaction may be determined not only based on the level of security associated with a particular information or data element, but also based on other factors, such as the identity of the entity requesting the information. For example, the user may configure the information wallet such that the user's spouse is granted access to all of the user's data, regardless of the level of security with which the data is associated. As another example, the information wallet may be configured such that the user's health care providers are given easier access to the user's health-related data, and the user's accountant is given easier access to the user's financial data. Hence, the user's approval may be prompted prior to the user's financial data being provided to the user's health care provider, but not prior to the user's financial data being provided to the user's accountant. Conversely, the user's approval may be prompted prior to the user's health-related data being provided to the user's accountant, but not prior to the user's health-related data being provided to the user's health care provider. As will be appreciated, the level of security provided may also be dependent on other factors, such as the time of day that the data is being requested (e.g., a request for data occurring in the middle of the night might be considered to be more likely to be fraudulent in some circumstances), the location of the requester (e.g., the IP address of the requester may indicate that the requester is overseas), the location of the user (e.g., the GPS signals from the user computing device 120 may indicate that the user is at a location that would not normally be associated with a request for health-related information), etc. As will be appreciated, heightened levels of security provided may also be provided in certain circumstances as a result of the operation of other fraud prevention algorithms (e.g., a pattern of requests for financial information may be identified as being unusual and therefore potentially fraudulent).

As discussed above, the action required to be taken by the user in order to approve such an information exchange may also be varied depending on the circumstances. For example, in some instances, approval may be passively granted based on the settings the user has set for their data (e.g., no affirmative action is required by the user to give the user's spouse access to the user's data). In other instances, affirmative action may be required to be taken on the part of the user. Again, the type of action may vary depending on the situation and the level of security to be provided. For example, in some instances, the approval may require the user to simply press a button labeled "approve" on the user computing device 120. In other instances, the approval may require the user entering a pin number or other secret password or code on the user computing device 120. As another example, biometric authentication, such as a body print, may be required. As will be appreciated, any number of different actions and different types of transactions may be required of a user in order to provide different levels of security in the context of particular information exchange transactions.

As will also be appreciated, in various embodiments, the information wallet system 100 may provide greater security than physical paper forms because the information is fully encrypted when exchanged and people do not have direct visual access to confidential data. The adapters on the entity computing systems 105 may provide an additional layer of protection by enforcing security settings of the information wallet computing system 115. In various embodiments, the information wallet system 100 may also provide enhanced security by providing an easier alternative to manually managing large amounts of password and authentication data. A user who is required to have a plurality of usernames and passwords for different accounts may feel compelled to catalog the plurality of passwords and associated websites on a hard copy for easy access. For example, a user may write down a list of passwords and keep the passwords within reach for easy reference, thereby impairing the security of the sensitive information. In one embodiment, after using the information wallet for over a period of time, the user may no longer have to remember a plurality of passwords for a plurality of websites or entities, etc. The user may self-authenticate using a combination of the identity of the device, biometric information acquired from the user by the user computing device 120, a single unified pin/password, or other identification methods.

In some embodiments, digital signatures may be used to certify the entity, the customer, the user, or the data. For example, driver's licenses typically contain information such as the date of birth, name, address, eye color, height, weight, donor status, etc., of the holder of the driver's license. Assuming data for the driver's license is obtained from an official government department, such as the department of motor vehicles for the state issuing the driver's license, the driver's license data may be digitally signed by the department of motor vehicles using standard certification technology. Hence, when this data is communicated to another entity computing system 105, the digital signature may be communicated with the data to certify that the data is accurate. Additionally, biometric information received from governmental authorities may be used to certify an entity, the customer, the user, or the data. For example, people are often required to submit to a background check for certain employment, which often requires going to a police station to obtain a set of fingerprints. The data collected at the police station may be used for certification and self-authentication purposes.

FIG. 2 is a diagram showing various ways in which the information wallet account (through an information wallet application 140) may be enriched with data. For example, data may be entered manually by the user via a keyboard or other suitable device. The user may enter information including a name, address, phone number, contacts, calendar, and other information. Also, image data may be received via a scanner, wherein scanned information may include, for example, a birth certificate, license, diploma, etc. Data may be received from smart devices such as cars, alarm clock, medical device, appliances, watches, phones, tablets, etc. and any application running on these devices. Biometric information may also be received, such as voiceprint, fingerprint, palm print, facial recognition information, etc. In some embodiments, the biometric information may be digitally signed either by a government agency, the entity that provides the cloud storage computing system 150 (e.g., a bank), or other trusted authority. In such embodiments, the information may then be used for biometric authentication. The data received from the smart devices may be stored. The data may be stored in a database. The data may be stored in standard predefined fields of the database or may be stored in customized fields as defined by the storing entity (e.g., in fields created by augmenting standard predefined fields). The data stored may be augmented with additional data or deleted. Stored data may include metadata such as a time stamp or a version number. Data may be permanently stored unless a delete command is received from the user.

Data may be additionally received as an encrypted payload over email, USB drive, wired or wireless Internet, and so on. The encryption allows the information to be transferred safely without being accessed from an unauthorized party. The information wallet account may also receive information from the context of a transaction with a merchant or entity. This may include purchase transaction information of any type, including the price of an item, the selection of a gift, additional warranty information, receipt information, etc. The information wallet application 140 may download data from online sources, such as online account information, telephone information, invoices, etc. The data from these and other sources may be used to enrich the information wallet and later made accessible to the entity computing systems 105 via the user computing devices 120.

FIG. 3 is a schematic diagram showing how the data collected in FIG. 2 can be published to various entities. As shown in FIG. 3, a user may share information with government entities, merchants, healthcare providers, employer, friends/family, and others. This information may be shared according to permissive authorizations and security levels as discussed above. FIG. 3 depicts the passive delivery of data wherein the user has configured data to publish to entities automatically, so that the user does not need to remember to publish the data. For example, if the user has a change of address, the updated address may be automatically transmitted to friends/family, employers, health care providers, merchants, the government, financial institutions, and so on. While FIG. 3 shows automatic sending of data (e.g., publishing), as will be appreciated, the information wallet system 100 may also be used for automatically receiving data (e.g., subscribing). For example, the user may subscribe to automatically receive data or messages regarding specific content from a specific entity computing systems 105. While some information may be configured to publish and subscribe automatically, other information may be configured to block automatically. For instance, the system may be configured to prevent publishing information to specific entities (i.e. credit card companies) or to block automatic subscriptions to certain entity publications (i.e. weekly e-newsletters).

Figure 4:
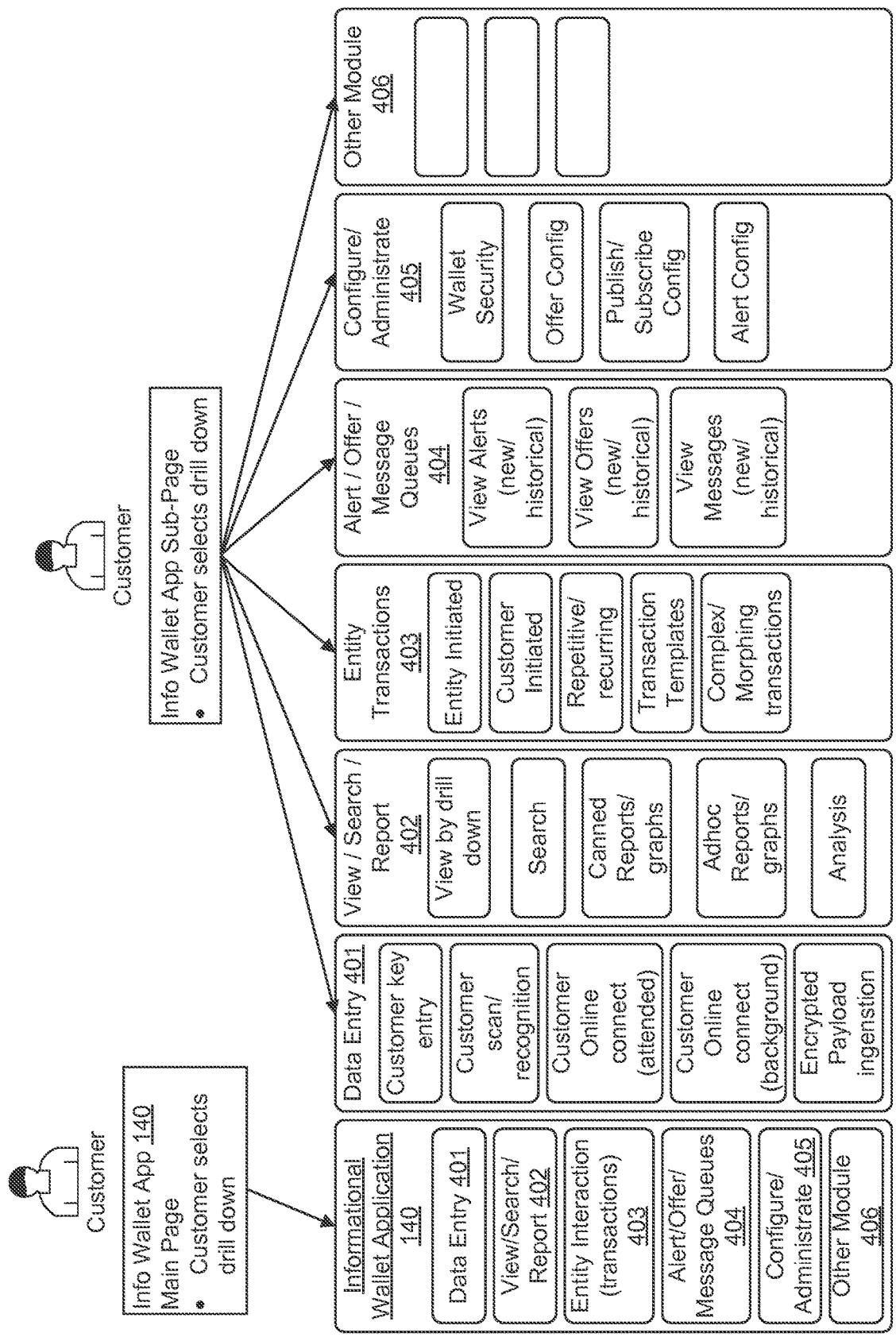
FIG. 4 is a schematic diagram of a computer-implemented information processing system from FIG. 1.

FIG. 4 is a schematic diagram showing tools provided to the user via a user information wallet application 140 operating on the user computing device 120 according to an exemplary embodiment. The tools shown in FIG. 4 provide the user with different ways of entering, updating, accessing and analyzing their data stored in the cloud storage computing system 150. As shown in FIG. 4, by way of a top-level menu level of the information wallet application 140, the user may be provided with data entry tools 401, view/search/report tools 402, entity interaction tools 403, alert/offer/message queue tools 404, configure/administrate tools 405, and other module tools 406. As shown in FIG. 4, by selecting one of the top-level menu items, the user may be taken to a drill down menu that provides further options. In one embodiment, the data entry tools 401 allow a user to enter information into the information wallet system 100 through the user computing device 120. The data may be gathered by typing information into a screen or by capturing the information via other methods, including but not limited to capturing images, a vocal recording, a video recording, etc. The data entry tool 401 may have a drill down menu that provides more functions for the application. In one embodiment, the data entry tool 401 drill down menu includes modules such as customer key entry, customer scan/recognition, customer online connect (attended) customer online connect (background), and encrypted payload module. Customer key entry and scan/recognition modules support the data and information gathering functions discussed above. The customer online connect modules, both attended and background, facilitate the functions of gathering the data and information from the customer and transferring the data and information to the cloud storage computing system 150. The encrypted payload module serves to encrypt the data prior to transferring the data from the user computing device 120 to the cloud storage computing system 150 of the information wallet computing system 115. Any of the modules and functional units discussed above or below may contain logic executable by a processor to achieve the described functions.

The view/search/report tool 402 may allow the customer or user to view, search, and retrieve information from the information wallet application 140. For example, a customer may want to view specific information that the customer previously entered into the system through the data entry tool 401. To retrieve the information, the customer may use the view/search/report tool 402 module to enter certain parameters. The backend portion of the information wallet application 140 may retrieve the data from the cloud storage computing system 150 according to the parameters entered by the customer and deliver the information to the user computing device 120. In one embodiment, the view/search/report tool 402 drill down menu includes modules such as view by drill down, search, canned reports/graphs, ad hoc reports/graphs, and analysis. These modules allow functions described above to occur, such as searching for information using certain parameters. The view by drill down menu may allow any information that the customer desires to view to be displayed in a list, which further displays related information upon engaging the list. The modules also allow the information to be presented in an organized, useful manner through avenues including graphs and reports. The information, data, reports, and graphs may be used for any type of analysis or metric functions. The analysis module may support functions such as retrieving a list of data, retrieving details behind the data, listing aspects of the data with accompanying relevant information, and so on. Analytics that may be performed may include numerical calculations, metric evaluation, a summary or analysis of numeric data (such analysis including mean, average, standard deviation, percentages, comparison, likelihood), cost projections, and so on. The user can also install applications (commonly called "apps") that specifically provide reporting and/or analysis to the user based on data in the informational wallet. For example, an application may correlate, driving habits, eating habits, and sleeping habits to health data (e.g., heart rate, blood pressure, oxygen saturation, etc.).

The entity transaction tool 403 allows the customer information wallet to interact with an entity through the information wallet system 100. In one embodiment, the entity transaction tool 403 drill down menu may include modules such as entity initiated, customer initiated, repetitive/recurring, transaction templates, and complex/morphing transactions. Through these modules, the customer may control how the customer interacts with the entity and how the entity is allowed to interact with the customer through the information wallet system 100. The entity initiated module allows a customer to control how entities initiate information requests or information transfers. The customer initiated module allows a customer to determine the manner in which it initiates transactions with an entity. For example, a customer may configure the information wallet application to solicit coupons for savings from specific entities. The repetitive/recurring module allows the customer to exact control on the interactions with the entities through the information wallet system 100 according to a specified period. For example, a customer may give recurring orders through the repetitive/recurring module (e.g. ordering medication every month). The transaction template module allows a customer to set a template on how information should be handled such that the transaction may easily occur in the future. Different entities may also have transaction templates, which could be transferred to the user computing device 120 and stored for easy use. The complex/morphing transactions facilitate transactions that are more complex than straight-forward transactions and change over time. These difficult transactions may involve greater manipulation and monitoring, and the complex/morphing transactions modules help facilitated those functions. The user may be able to write rules that govern these complex transactions. For example, the user may specify a rule that indicates that the user is to be prompted to order medication if blood pressure went over a certain threshold within the month.

In one embodiment, the alert/offer/message queues tool 404 includes a drill down menu with modules including view alerts, view offers, and view messages. These modules assists in displaying alerts from activities, offers from entities, or messages from any computing system connected with the information wallet system. The displays, offers, or messages may be new or historical. In one embodiment, the configure/administrate tool 405 contains a drill down menu with modules such as wallet security, offer configuration, publish/subscribe configuration, and alert configuration. The wallet security module controls the security of the wallet. A customer may engage this module to edit the security settings of the wallet and of information shared from the wallet. For example, the security level for certain information may be assigned using the wallet security module. The offer configuration module allows a customer to control which offers it receives from entities. This module supports the function of blocking or allowing offers received by the information wallet. The publish/subscribe configuration controls the manner in which information from the customer's information wallet account may be shared with other entity computing systems 105. Any of the modules discussed throughout the disclosure may communicate or interact with other modules in order to fulfill the required functions. For example, the publish/subscribe configuration module may interact with the wallet security module to determine what information to publish and to which entity. In one embodiment, the publish/subscribe configuration module determines the information's level of security as set in the wallet security module, then publishes the information according to the assigned security level. If information is set at a high level of security and requires a pin and thumbprint to publish, then the publish/subscribe configuration module may communicate with the wallet security module to enforce the pin and thumbprint requirement prior to publishing the information. The alert configuration modules allow a user to control when alerts may be given by the system. For example, a user may use the alert configuration module to set up an alert each time a user's social security number is solicited or shared. Other module tools 406 represent a plurality of modules that may facilitate the implementation of any desired function of the information wallet system.

FIG. 5 is a diagram showing information synchronization between various information wallet (IW) adapters 505 and user applications. Various adapters 505 may be developed to promote easy integration with business applications and systems, user devices, legacy systems, and so on. The adapters 505 may be used to enforce common data protocols and schemas. The adapters 505 may also be used to synchronize information traveling between, for example, entity computing systems 105 and the information wallet application 140 on a user computing device 120. As indicated in FIG. 5, different adapters 505 may be developed for different industries and tailored to meet specific industry needs. Adapters 505 may be developed for different software applications used by different types of businesses. Different data schemas may be developed for different domains (e.g., different industries). Again, the adapters within a common domain (e.g., healthcare) may use the same schemas to promote common data protocols and schemas. In various embodiments, the adapters may utilize both standard and non-standard schemas. For example, an entity may be permitted to add, change, and/or delete any data element with the approval of the user. Those data elements can be standard data elements within a domain or custom elements within a domain. In addition, an entity may be permitted to add a custom extension to an existing data element that is either standard or custom. In all cases, the adds, changes, and/or deletes may be versioned and saved such that the full data picture is preserved. In some situations, destructive deletes may be permitted with the approval of the user or at the request of the user. Adapters 505 may also enforce security standards of the computing systems and information transferring between the computing systems of the information wallet system 100.

Figure 6:
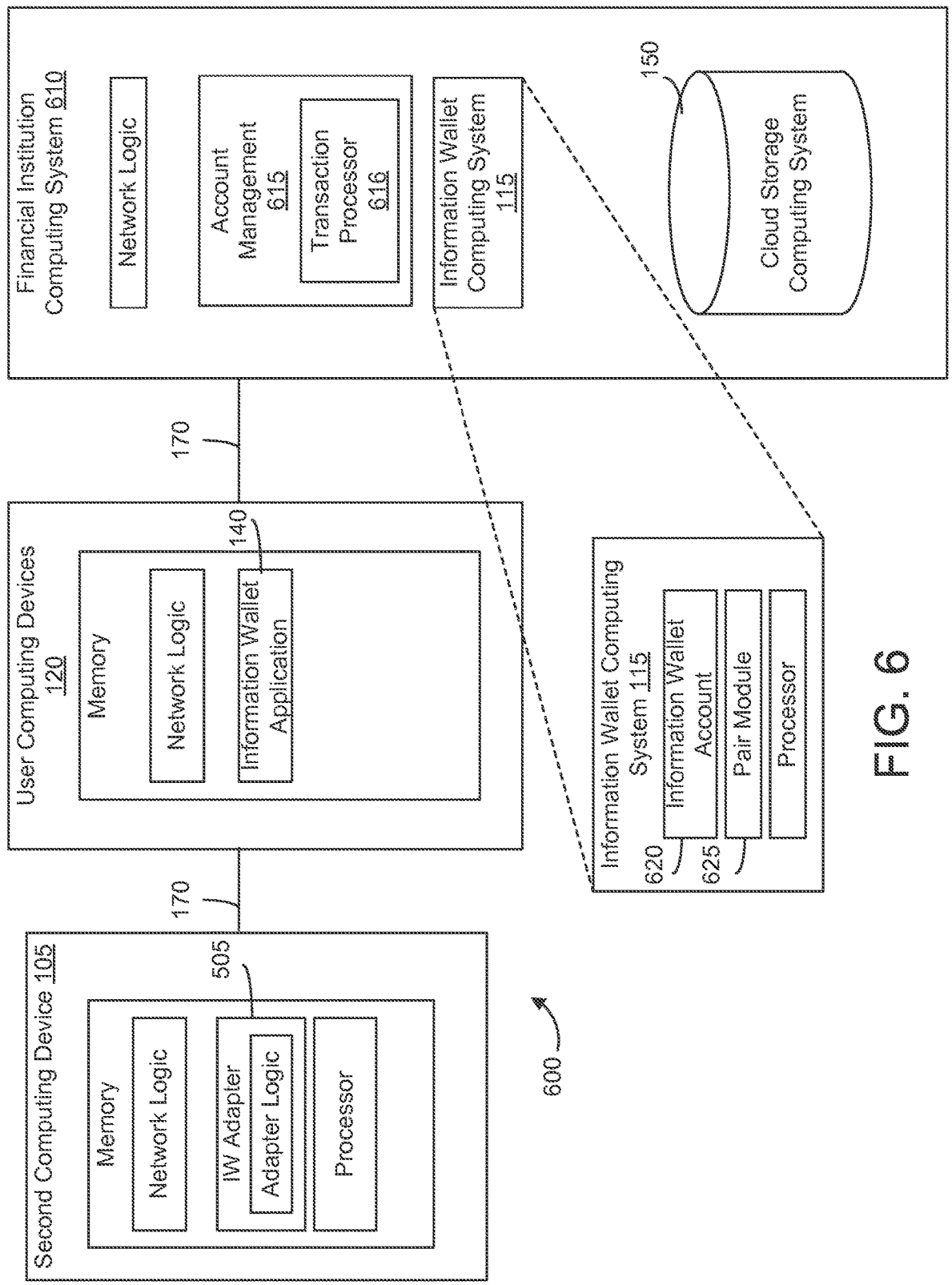
FIG. 6 is a schematic diagram of another computer-implemented information wallet system according to an exemplary embodiment.

FIG. 6 shows an information wallet system 600 according to an exemplary embodiment. System 600 may utilize the above described systems and methods associated with the information wallet system 100 to connect computing device 120 with second computing device 105, such as to exchange or transmit settings preferences and other information between user computing device 120 and the second computing device 105. The second computing device 105 may be included as part of the entities 105 of system 100 shown in FIG. 1. The second computing device 105 may be included as part of a second device and may be configured to control one or more settings of the second device. For instance, system 600 may be used to automatically send a user's settings preferences to the second computing device 105 upon a request of the user, such that one or more settings of the second device may be modified to match the settings preferences. The second device may include a vehicle of the user, a home appliance, a media device, or another device having adjustable settings and configured to receive user settings via system 600. According to system 600, user computing device 120, second computing device 105, and information wallet computing system 115 are connected and configured to communicate (e.g., transmit data) via network 170. The user computing device 120 includes information wallet application 140. The information wallet application 140 may include computer software with executable code and may be downloaded and installed on a device such as user device 120. The information wallet application 140 may be configured to run on any operating system and may allow secure access to the information wallet computing system 115.

According to the embodiment of FIG. 6, the user computing device 120 and the second computing device 105 are paired (e.g., connected, communicatively coupled, etc.), such that information may be transmitted freely between the devices 120 and 105. The user computing device 120 may be configured to pair with the second computing device 105 using the information wallet application 140 and the IW adapter 505. In one embodiment, for instance, the user may pair the user computing device 120 with the second computing device 105 by accessing the information wallet application 140 stored on the device 120 and selecting an option to pair the device 120 with the device 105. In another embodiment, the devices 120 and 105 may be configured to automatically pair when the devices 120 and 105 are within close proximity of each other (e.g., within a specified distance of each other). For instance, the user computing device 120 may be configured to pair with the second device 105 by near field communication (NFC) when the device 120 is placed in close proximity to the device 105. The devices 120 and 105 may be connected via the network 170, as shown in FIG. 6, which may include one or more of the Internet, a cellular network, near field communication (NFC), a Bluetooth connection, Wi-Fi, Wi-Max, a proprietary banking network, etc. In another embodiment, the devices 120 and 105 may be paired using a wired connection.

The information wallet computing system 115 includes an information wallet account 620. The information wallet account 620 may be an account assigned to a user of the information wallet system 600 (e.g., a single person user, a family or other group, etc.). The information wallet account 620 may be used to store information related to the user, such as basic identifying information for the user, financial information, health information, or other information as may be determined by the user. In one embodiment, the stored information (e.g., user information) includes settings preferences for one or more devices or systems that may be used by the user. For instance, the stored information may include settings preferences for a vehicle, such as temperature settings, radio settings (e.g., preferred stations, volume settings, etc.), seat adjustment settings, mirror settings, airbag settings, light settings, and the like.

The information wallet account 620, including any data within, may be accessed (e.g., entered, stored, edited, removed, etc.) by the user via the information wallet application 140 of the user device 120. The information wallet application 140 may include computer software with executable code and may be downloaded and installed on a device (e.g., user device 120, second computing device 105, etc.). The information wallet application 140 is configured to run on any operating system and allows secure access to the information wallet computing system 115.

According to system 600, the user device 120 communicates with the second computing device 105 via the network 170. The second computing device 105 may include an information wallet (IW) adapter 505 and adapter logic disposed within the IW adapter 505. For instance, the IW adapter 505 may be used to synchronize data between the second computing device 105 and the user device 120. The user device 120 may be configured to communicate with another computing system (e.g., system 115), such as by communicating with an information wallet adapter 505 included within the system. There may be a plurality of IW adapters disposed on a plurality of computing systems within the information wallet system 600 and configured to act as secure portals in which information is sent and received between the computing systems. For instance, the adapters 505 may be installed on the second computing device 105 to integrate the system 105 with the information wallet computing system 115 (e.g., by configuring the adapter 505 to interact securely with an adapter of the system 115).

Information wallet adapters 505 may be configured to request and/or send certain types of information. Adapters 505 may also be configured to receive requests for information, such as from one or more computing systems or devices within the information wallet system 600. The configuration may be written into executable code in the adapter logic and executed by a processor of the second computing device 105, for instance. The IW adapters 505 may also contain adapter logic which allows the second computing device 105 to connect with and operate with the user computing device 120 and the information wallet computing system 115 through the information wallet system 600. The adapter logic may also be executable by a processor and may allow the second computing device 105, for instance, to implement a number of functions. The IW adapter 505 on the second computing device 105 may allow a second device to integrate into or pair with the information wallet system 600 without having to perform a full overhaul of the second computing device 105. The IW adapters 505 may also provide a compartmentalized method of adapting the second computing device 105 to the information wallet system 600, which may further allow greater ease in transitioning, implementing, and using the system 600. The IW adapters 505 may be configured to fully integrate with the second computing device software, information or financial accounts of the user, and other software. The IW adapters 505 may also be configured to communicate between the cloud storage computing system 150 and the information wallet system 600. In one embodiment, the IW adapters 505 are configured to communicate with and perform functions such as synchronize information, integrate technologies, and enforce the security procedures set by a user or a computing system.

According to the system 600, the second computing device 105 is configured to receive information from the information wallet computing system 115 (e.g., the information wallet account 620). For instance, information stored on the information wallet account 620 (e.g., entered and stored to the account 620 by the user) may be transmitted to the second computing device 105 via network 170. The second computing device 105 is also configured to receive information from the user device 120 via the network 170, such as by the user entering information using an input device or interface of the user device 120 (e.g., using the information wallet application 140) and transmitting the information to the second computing device 105. As described above, the user device 120 and the second computing device 105 may be securely integrated or otherwise communicatively connected using an IW adapter 505. The IW adapter 505 may allow a user to interact with the second computing device 105 (e.g., using the information wallet application 140). The user may also access the information wallet account 620 in order to store, edit, delete, and otherwise manipulate the information within the account 620 using the information wallet application 140.

The system 600 may also include a financial institution computing system 610 held by a financial institution. In one embodiment, the financial institution computing system 610 is responsible for and houses the information wallet computing system 115. In this embodiment, the information wallet accounts held by the financial institution may include accounts associated with persons not having a financial account with the financial institution. However, users having both financial accounts and information wallet accounts held by the financial institution may be able to transfer information between the two types of accounts, or the two accounts may be integrated into a single account. The computing system 610 may include various storage (e.g., cloud storage computing system 150, external entity storage system 160, etc.), such as banking servers, configured to store data relating to a plurality of customer accounts, financial records, and other documents. The stored data may be backed up in multiple data centers, for example, data centers that are geographically diverse. The computing system 610 may include account management logic 615, which may include programming modules stored in a memory and configured to be executed by a processor (e.g., the processor of the banking server, etc.). The account management logic 615 may be part of the banking servers or may reside on a separate server within the computing system 610. The account management logic 615 may perform any typical functions and transactions associated with managing and maintaining a bank account for a customer, including, but not limited to opening new accounts, closing existing accounts, crediting accounts, debiting accounts, transferring funds between accounts, processing debit and credit card transactions, calculating and applying interest, calculating balances, performing account transfers, processing electronic bill payment transactions, and the like. The account management logic 615 may include transaction processing logic 616 to perform the above recited tasks. The account management logic may be configured to manage a plurality of types of accounts, including but not limited to demand deposit accounts (e.g., checking accounts, savings accounts, etc.), credit card accounts, lines of credit, and the like. The financial institution computing system 610 may include interface logic (e.g., network logic) configured to connect the financial institution computing system 610 to computing systems associated with the plurality of users (e.g., user computing devices 120, second computing devices 105, etc.) by way of a communication network (e.g., network 170). The financial institution computing system 610 may include import logic configured to import financial statements regarding the financial accounts on a scheduled basis and/or to import user-provided information or documents on a user-determined timing basis.

The information wallet system 600 may be utilized to provide user-related information (e.g., information related to a user of system 600, system 100, information wallet account 620, etc.) that is related to or associated with the second device or the second computing device 105. The second device may be a vehicle driven by or holding the user, a home appliance utilized by the user (e.g., a washer or dryer, a stove, a refrigerator, etc.), a media device (e.g., a television, a stereo, a gaming device, etc.), or another device having adjustable settings. In response to receipt of the user information, the second computing device 105 associated with the second device may automatically adjust the settings based on the user information. For instance, the second device may be a rental car and the user may utilize the system 600 to send user information regarding vehicle preferences to the system 105 of the rental car. The rental car computing system 105 may then adjust one or more settings of the rental car according to settings preferences of the user, such as by adjusting the seat, the mirrors, or the volume of the stereo. The settings preferences provided by the user may depend on a particular device being utilized. The user computing device 120 may also be used as a remote for a television or other electronic device. For instance, the user computing device 120 may be "paired" or otherwise connected with a television (e.g., the second device) and automatically apply the user's preferences to the television. In this way, the user computing device 120 may "match" the user's favorite television programs or networks with the paired television to allow the user to control the television to find a known program or network or otherwise change stations. The user's preferences may also include a volume level or other settings related to or associated with the television. The television may utilize the IW adapter 505 to retrieve customer preferences or favorites and allow the user to select or find channels from a known device (e.g., a home device) regardless of the interface of the paired television.

The information wallet computing system 115 is configured to receive user information associated with a user of the system 600, such as settings preferences related to the second device. Upon receipt, the information may be stored within the information wallet account 620. The information wallet computing system 115 is configured to receive the settings preferences from the user computing device 120. For instance, the user may manually access the information wallet account 620 via the information wallet application 140 stored on the user computing device 120. The user may enter settings preferences via the application 140 to be stored within the account 620 (e.g., received by the system 115 directly from the user). The user may select a type of device (e.g., passenger vehicle, stereo, video game device, etc.) or a device category or system (e.g., kitchen devices, hotel room, bathroom devices, etc.) and store settings preferences related to the device or system. The user computing device 120 may be configured to automatically send the settings preferences to the information wallet computing system 115 upon receipt from the user, or to send the settings preferences manually in response to an additional signal or input from the user (e.g., received via the application 140).

The information wallet computing system 115 is also configured to receive settings preferences via a paired device (e.g., second device 105 paired with the user computing device 120). As described above and shown in FIG. 6, the second computing device 105 and the user computing device 120 may be paired using the network 170. When the devices 120 and 105 are paired, settings adjustments and preferences for the second device 105 that are controlled using the second computing device 105 may be sent to the information wallet computing system 115 and stored within the information wallet account 620. In one embodiment, the second computing device 105 is configured to send the settings preferences to the system 115 directly. For instance, the second computing device 105 may be configured to include information regarding the paired user computing device 120 and/or the user so that the information wallet computing system 115 is able to store the information within the appropriate information wallet account (e.g., account 620). The second computing device 105 may also be configured to send the information to the information wallet computing system 115 via the user computing device 120. For instance, the second computing device 105 may send information, including settings preferences, to the user computing device 120, and the user computing device 120 may transmit the information to the information wallet computing system 115 (e.g., via the information wallet application 140).

Similarly, the information wallet computing system 115 may also be paired with an entity. For instance, data stored within the information wallet computing system 115 may be automatically shared and updated with an entity associated with the user, such as a friend or a physician. The user may be able to select the data that is shared with one or more entities using the information wallet application 140. The information may be sent and/or updated automatically or sent manually by the user using the application 140. As an example, the user may send health-related data to a physician by pairing the information wallet computing system 115 with a system or account of the physician.

The settings preferences may be stored automatically. For instance, the second computing device 105 may be configured to send settings preferences to the information wallet computing system 115 automatically when a setting is adjusted (e.g., by the user), after a setting has been adjusted but remains static for a period of time, upon scheduled time intervals, when the device 105 is turned on or turned off, and so forth. The settings preferences may also be stored manually. For instance, the second computing device 105 may be configured to send settings preferences to the information wallet computing system 115 upon request by the user, such as using the information wallet application 140.

In another embodiment, the information wallet computing system 115 is configured to determine (e.g., calculate, estimate, etc.) one or more settings preferences for the user. The information wallet computing system 115, using a processor of the system 115, may be configured to access the information wallet account 620 and determine one or more settings preferences based on the information stored within the account 620. For instance, the system 115 may determine seat settings and mirror settings for a vehicle based on a size of the person, including a height or weight, which may be stored within the account 620 (e.g., driver's license, health records, etc.). As another example, the system 115 may automatically adjust any settings preferences based on an impairment of the user, such as a hearing or vision impairment (e.g., to use only visual output for a user with a hearing impairment), as determined using information within the account 620. The information wallet computing system 115 may also be configured to seek further input based on the information stored within the account 620 in order to determine the settings preferences. The information wallet computing system 115 may determine the settings preferences based on the stored information and the additional information received from the user. The system 115 may be configured to request information from the user via the information wallet application 140. The information wallet computing system may also be configured to determine additional settings preferences based on settings preferences manually entered by the user. The information wallet computing system 115 may be configured to store any determined settings preferences within the information wallet account 620. The settings preferences that are determined by the information wallet computing system 115 may be automatically stored or stored subject to approval by the user (e.g., via the application 140).

The information wallet computing system 115 may be configured to store the settings preferences according to a device type or function, such as to later apply appropriate settings preferences when using another similar device. In one embodiment, the information wallet computing system 115 is configured to sort settings preferences or other information received based on a device type, function, or based on another characteristic suitable for the particular application of system 600. For instance, when the user drives a paired vehicle, the information wallet computing system 115 may receive settings preferences related to a driver seat or mirror position of the vehicle. The information wallet computing system 115 may store these preferences for use with another vehicle. The information wallet computing system 115 may also receive settings preferences related to the stereo within the vehicle, such as station preferences or sound levels. The information wallet computing system 115 may store these preferences for use with another vehicle, as well, but may also be configured to store these preferences for use with a home stereo that serves a similar function.

The information wallet computing system 115 is configured to send information stored within the information wallet account 620, including settings preferences related to the second device 105 and the user, to the second computing device 105 using the system 600. For instance, the information wallet computing system 115 may send settings preferences related to the device 105 when the user is utilizing the second device 105, or when the user computing device 120 (or the information wallet computing system 115) is paired with the second device 105. The information wallet computing system 115 may be configured to send the settings preferences directly to the second computing device 105, or the information wallet computing system 115 may deliver the settings preferences to the user computing device 120 (e.g., through the information wallet application 140) in order for the device 120 to send the information to the second computing device 105.

In one embodiment, the information wallet computing system 115 is configured to send settings preferences to the second device 105 in response to a request (e.g., from the user via the user computing device 120, from the second computing device 105). The user computing device 120 and/or the second computing device 105 may be configured to send a request for settings preferences to the information wallet computing system 115 when the second computing device 105 is paired with the user computing device 120, for instance. In another embodiment, the information wallet computing system 115 is configured to send settings preferences to the second computing device 105 that are related to the second device 105 when the information wallet computing system 115 is connected to the second computing device 105 (e.g., via the network 170), such as when the second computing device 105 is paired with the user computing device 120.

Figure 7:
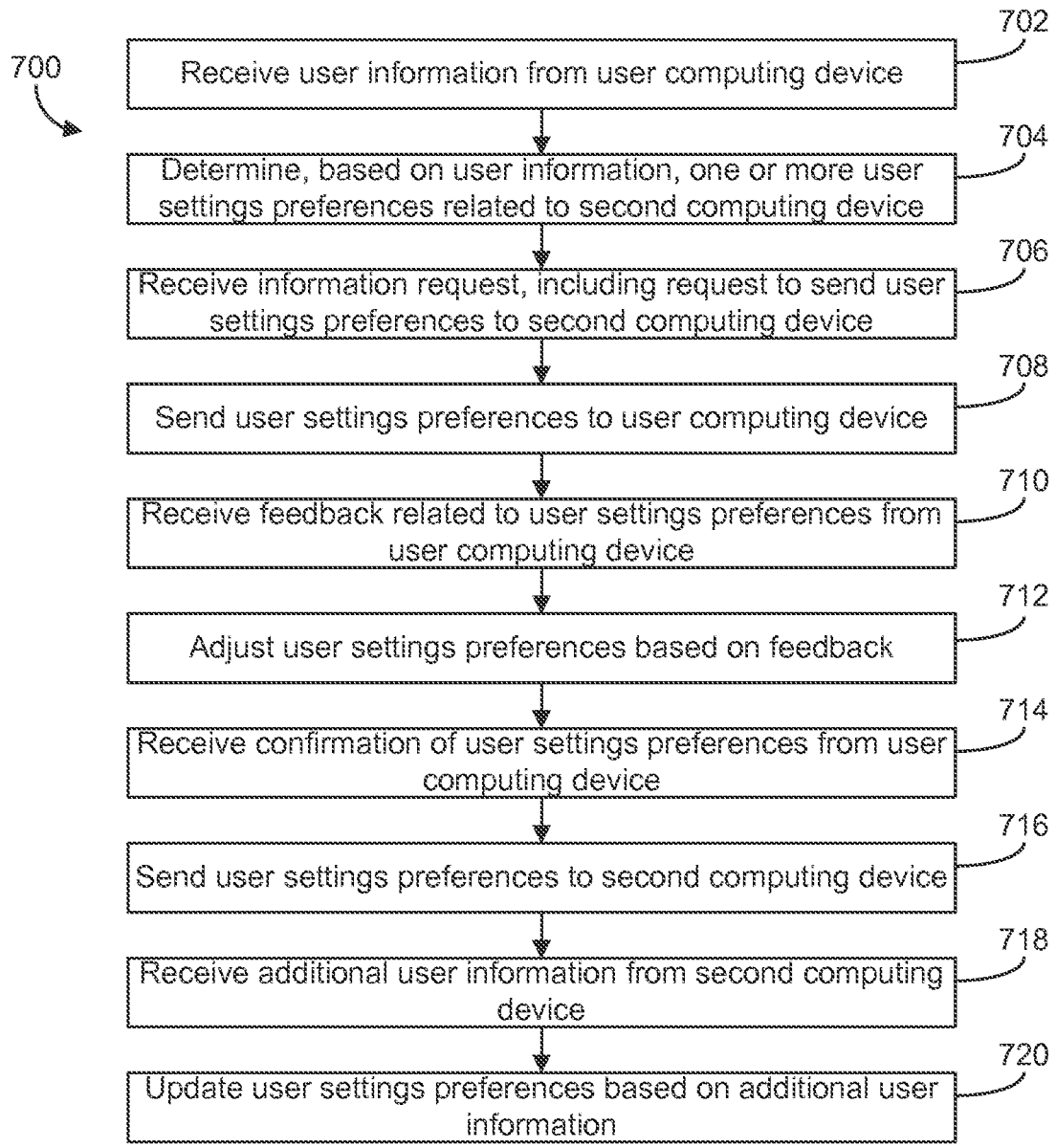
FIG. 7 is a flow chart diagram showing a process for providing user settings preferences for a paired computing device.

Referring now to FIG. 7, a flow chart of a process 700 for pairing an information wallet account (e.g., account 620) with a computing device (e.g., second computing device 105) is shown according to an example embodiment. The process 700 may be performed using systems 100 or 600. For instance, the process 700 may be performed by an information wallet computing system 115 configured to communicate (e.g., send and receive information) with a user computing device 120 and a second computing device 105. In one embodiment, the process 700 may be implemented by a server having a memory and a processor, such as a server stored within the information wallet computing system 115 and/or stored within the financial institution computing system 610. The processor of the server may carry out the steps of process 700. The server may be controlled by one or more entities, such as a data storage entity (e.g., when server resides within the information wallet computing system 115) or a financial institution (e.g., when server resides within the financial institution computing system 610).

At 702, user information is received from the user computing device 120. The user information may be related to a user of the information wallet account 620. The user information may include any of the information described above in relation to the information wallet, such as basic identifying information for the user, physical characteristics (e.g., height, weight, etc.), location information, and other information that may be useful for the purposes of systems 100, 600 and/or the process 700. The user information may be entered manually by the user using the information wallet application 140 stored on the user computing device 120. The user information may be stored on the information wallet account 620. In one embodiment, the user information is provided by the user in response to a request from the information wallet computing system 115 to provide specific user information. For instance, the information wallet computing system 115 may be configured to request user information in order to determine one or more settings preferences for the second computing device 105. The user information may also be related to the second computing device 105. For instance, in one embodiment, the second computing device 105 includes a vehicle. In this embodiment, the user information may include seat position preferences, stereo-related preferences, or other vehicle-related preferences in order to determine one or more settings preferences for the vehicle (i.e., second computing device 105). In this embodiment, the user information may also include data or information that may be used to estimate one or more settings preferences for the vehicle, such as physical characteristics of the user in order to estimate a preferred seat or mirror position for the vehicle.

At 704, one or more user settings preferences are determined for the second computing device 105 based on the user information. In one embodiment, the user information includes one or more user settings preferences related to the second computing device 105 and the information wallet computing system 115 is configured to determine at least some of the user settings preferences for the second computing device 105 by pulling the preferences from the user information. The information wallet computing system 115 may also be configured to determine one or more user settings preferences by estimating the user settings preferences based on the user information, such as described above. The information wallet computing system 115 may send a request for additional information to the user computing device 120 in order to estimate the one or more user settings preferences. The user settings preferences and the user information may be automatically stored within the information wallet account 620 (e.g., within the information wallet computing system 115).

At 706, an information request is received to send information to the second computing device 105. The information request includes a request to send user settings preferences to the second computing device 105. The request may be received from the user computing device 120 or the second computing device 105 (e.g., via the user computing device 120). The request may include a request for specific user settings preferences and/or a request for any user settings preferences that are related to the second computing device 105. For instance, if the second computing device 105 is a vehicle, the request may include a request for any user settings preferences that are related to a vehicle or to driving.

At 708, user settings preferences are sent to the user computing device 120 (e.g., by the information wallet computing system 115). The user settings preferences may be viewed by the user on the user computing device 120 using the information wallet application 140. The user settings preferences sent to the user may be only those related to the connected second computing device 105. At 710, feedback is received from the user computing device 120 (e.g., the user). The feedback may be related to the user settings preferences. For instance, the user may be able to modify the user settings preferences received using the information wallet application 140. The user may be able to delete one or more user settings preferences, edit the preferences, or add additional preferences related to the second computing device 105. In one embodiment, a request for additional information may be sent to the user computing device 120 along with the user settings preferences, and the feedback may include responses to the requests.

At 712, the user settings preferences are adjusted (e.g., by the information wallet computing system 115) based on the feedback provided by the user. For instance, the feedback may include manual adjustments made to one or more of the user settings preferences, and the system 115 may be configured to adjust the user settings preferences accordingly and store the updated user settings preferences within the information wallet account 620. The feedback may also include additional user information, such as information provided in response to a request sent by the information wallet computing system 115. The system 115 may adjust the user settings preferences according to this additional user information, as well, or the system 115 may generate or determine additional user settings preferences based on the feedback.

At 714, confirmation of the user settings preferences is received from the user computing device 120. The confirmation may be received simultaneously with the feedback from the user computing device 120, in one embodiment. The user of the user computing device 120 may provide a confirmation using the information wallet application 140 if the user agrees with or accepts the user settings preferences provided by the information wallet computing system 115.

At 716, the confirmed user settings preferences are sent to the second computing device 105. The user settings preferences may be related to the second computing device 105. The user settings preferences are useable by the second computing device 105 to set or adjust one or more settings of the second computing device 105. For instance, in an embodiment in which the second computing device 105 is a vehicle, the user settings preferences may include instructions or guidelines for automatically adjusting a seat position, a mirror position, stereo settings, including a volume level, or other adjustable settings within a vehicle. If any of the settings are automatically adjustable, such as being controlled by the second computing device 105, the second computing device 105 may automatically adjust the settings. The user settings preferences may also be sent simultaneously to the user computing device 120 and made viewable to the user. The user may view the settings preferences in order to manually adjust one or more settings of the vehicle (or another computing device 105).

At 718, additional user information is received from the second computing device 105. The second computing device 105 may be paired with the information wallet computing system 115 when the user computing device 120 is connected to the second computing device 105, such that the second computing device 105 is configured to transmit information or data to the information wallet computing system 115. The second computing device 105 and the information wallet computing system 115 may be paired by connecting the user computing device 120 with the second computing device 105 using the network 170, such as by a Bluetooth or NFC connection (or other types of network connections, as described above). The second computing device 105 may be configured to send additional user information to the information wallet computing system 115 based on adjustments to settings of the second computing device 105 that are made by the user when the second computing device 105 and the information wallet computing system 115 are paired. The second computing device 105 may also be configured to send updated user information, such as settings adjustments made by the user, without pairing the second computing device 105 with the system 115. For instance, the second computing device 105 may send information to the user computing device 120 and the information may be relayed manually to the information wallet computing system 115 (e.g., by the user).

At 720, the user settings preferences are updated based on the additional user information received from the second computing device 105. For instance, the user settings preferences may be updated to match the setting used by the user the last time the second computing device 105 was used or the last time the second computing device 105 was paired with the information wallet computing system 115.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

What is claimed is:

1. A computing system comprising a server and one or more processors configured to:
   receive user information related to a user;
   determine, based on at least a physical characteristic in the user information, one or more user settings preferences related to a second computing device having one or more adjustable settings relating to a physical configuration of the second computing device, the second computing device being remote from the server;
   receive an information request transmitted to the server responsive to a user computing device being paired with the second computing device, wherein the information request includes a request to send the one or more user settings preferences to the second computing device, the request identifying the second computing device; and
   send, responsive to the user computing device being paired with the second computing device, the one or more user settings preferences to the second computing device, to cause the second computing device to adjust one or more settings of the second computing device based on the one or more user settings preferences.

2. The computing system of claim 1, the one or more processors further configured to receive additional user information from the second computing device, wherein the additional user information is related to use of the second computing device by the user, and update the one or more user settings preferences based on the additional user information.

3. The computing system of claim 1, wherein the computing system resides in a financial institution computing system, and wherein the computing system further comprises account management logic configured to manage accounts respectively associated with a plurality of users, the accounts including at least one of bank accounts or information wallet accounts.

4. The computing system of claim 1, wherein at least one of the one or more user settings preferences is determined by estimating the at least one user settings preference based on the user information.

5. The computing system of claim 1, the one or more processors further configured to provide an interface between the user computing device and the computing system.

6. The computing system of claim 1, wherein the computing system comprises a cloud storage computing system.

7. The computing system of claim 1, the one or more processors further configured to, prior to sending the one or more user settings preferences to the second computing device:
   send the one or more user settings preferences to the user computing device; and
   receive a confirmation of the one or more user settings preferences from the user computing device.

8. The computing system of claim 7, the one or more processors further configured to:
   receive feedback related to the one or more user settings preferences from the user computing device prior to receiving the confirmation from the user computing device; and
   adjust the one or more user settings preferences based on the feedback.

9. The computing system of claim 1, the one or more processors further configured to receive additional user information from the second computing device, wherein the additional user information is related to use of the second computing device by the user, and update the one or more user settings preferences based on additional user information from the second computing device, and send the updated user settings preferences to the second computing device, wherein the updated user settings preferences are useable by the second computing device to adjust one or more settings of the second computing device.

10. The computing system of claim 1, wherein the physical characteristic in the user information indicates a height of the user.

11. The computing system of claim 1, wherein the physical characteristic in the user information indicates a weight of the user.

12. The computing system of claim 1, wherein the second computing device is a vehicle of the user.

13. The computing system of claim 1, wherein the second computing device is a home appliance of the user.

14. The computing system of claim 1, wherein the one or more user settings preference of the second computing device comprises a temperature setting.

15. The computing system of claim 1, wherein the one or more user settings preference of the second computing device comprises a radio setting.

16. The computing system of claim 1, wherein the one or more user settings preference of the second computing device comprises a seat adjustment setting.

17. The computing system of claim 1, wherein the one or more user settings preference of the second computing device comprises at least one of a mirror setting or a light setting.

18. The computing system of claim 1, wherein the user information is received from the user computing device remote from the server, wherein the received information request is transmitted by the user computing device, and wherein the second computing device is configured to enforce a common data protocol and to synchronize information traveling between the second computing device and the computing system.

19. A method implemented by a computing system comprising a server and one or more processors, the method comprising:
receiving user information related to a user;
determining, based on at least a physical characteristic in the user information, one or more user settings preferences related to a second computing device having one or more adjustable settings relating to a physical configuration of the second computing device, the second computing device being remote from the server;
receiving an information request transmitted by the user computing device to the server responsive to a user computing device being paired with the second computing device, wherein the information request includes a request to send the one or more user settings preferences to the second computing device, the request identifying the second computing device; and
sending, responsive to the user computing device being paired with the second computing device, the one or more user settings preferences to the second computing device, to cause the second computing device to adjust one or more settings of the second computing device based on the one or more user settings preferences.

20. The method of claim 19, wherein the user information is received from the user computing device, wherein the received information request is transmitted by the user computing device, and wherein the method further comprises receiving additional user information from the second computing device, wherein the additional user information is related to use of the second computing device by the user, and updating the one or more user settings preferences based on the additional user information.

* * * * *